2 Sheets—Sheet 1.
J. S. KIDD.
WAGON DUMP AND ELEVATOR.
No. 11,340.
Reissued May 23, 1893.
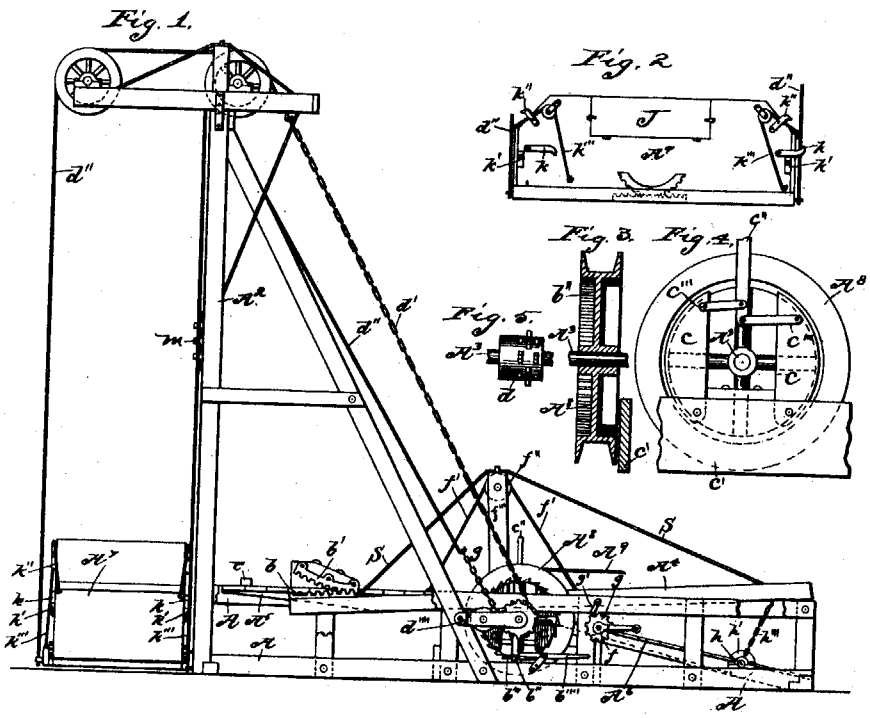
Witnesses
J. L. Tunison
Martin H. Olsen.
Inventor
John S. Kidd.
By Coburn & Thacher
Attys
THE NORRIS PETERS CO., PHOTO-LITHO., WASHINGTON, D. C.

2 Sheets—Sheet 2.

J. S. KIDD.

WAGON DUMP AND ELEVATOR.

No. 11,340. Reissued May 23, 1893.

Witnesses
J. L. Tunison
Martin A. Olsen

Inventor
John S. Kidd.
By Coburn & Thacher Attys

THE NORRIS PETERS CO., PHOTO-LITHO., WASHINGTON, D. C.

UNITED STATES PATENT OFFICE.

JOHN S. KIDD, OF DES MOINES, IOWA.

WAGON DUMP AND ELEVATOR.

SPECIFICATION forming part of Reissued Letters Patent No. 11,340, dated May 23, 1893.

Original No. 447,190, dated February 24, 1891. Application for reissue filed May 19, 1891. Serial No. 393,238.

*To all whom it may concern:*

Be it known that I, JOHN S. KIDD, a citizen of the United States, residing at Des Moines, in the county of Polk and State of Iowa, have invented a new and useful Wagon Dump and Elevator, of which the following is a specification.

Figure 6:
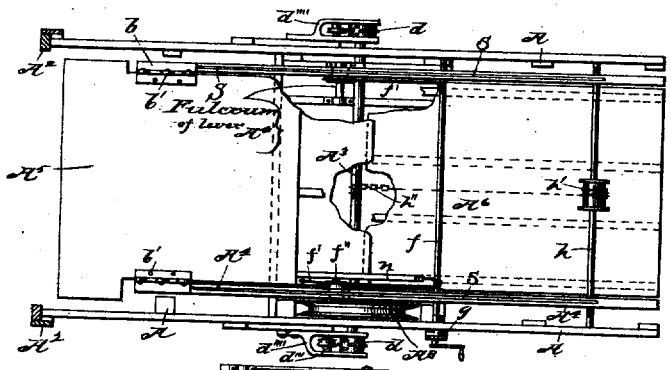
Figure 7:
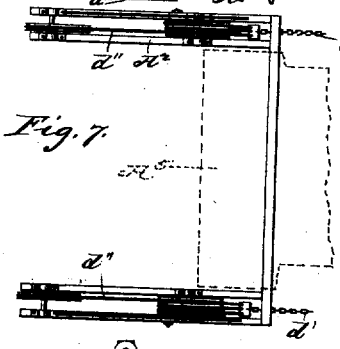
Figure 8:
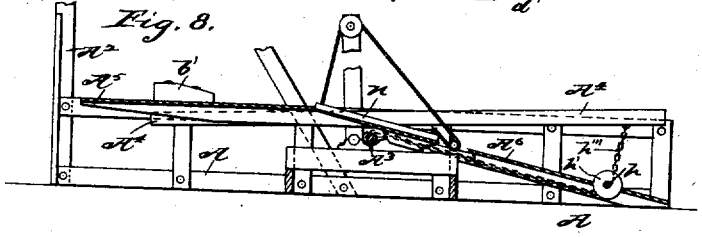

Figure 1 is a side view showing the dumping-platform in an elevated and level position, and the elevator box lowered to the ground at the end of the platform, in the position required to discharge the contents of the wagon on the platform into the elevator box. Fig. 2 is a side view of the elevator box. Fig. 3 is a vertical sectional view; Fig. 4, an end view of a drum that has an integral internal ratchet on one end and a friction break-device on the other side. Fig. 5 shows the construction of a sprocket-wheel adapted to be used in combination with the chain composed of plain elongated links of common form. Fig. 6 is a top view of the base and pivoted platform and operative mechanisms combined therewith; parts of the floors being broken away. Fig. 7 is a top view of the top of the elevator frame from which the elevator box is suspended and raised and lowered. Fig. 8 is a vertical sectional view through the line X—X, of Fig. 6.

In my patent, filed September 5, 1888, issued February 24, 1891, No. 284,662, I combine and suspend the elevator box with a dumping-platform adapted to receive and support a loaded wagon in such manner that the weight of the box would raise one end of the platform and dump the wagon. My object now is to utilize the weight of a suspended elevator box to raise the entire dumping-platform, and then tilt it after it is raised to dump the wagon. This enables me to use a low down platform with short approaches, which makes it much cheaper and more conveniently made portable. I accomplish these results as hereinafter set forth.

In the drawings, A represents the frame and base that supports the dumping-platform and elevator frame from which the elevator box is suspended.

$A^2$ is the elevator frame fixed to the rear end and sides of the base A.

$A^3$ is a rotating shaft in bearings fixed to the frame A.

$A^4$ are levers fulcrumed to the frame A near the shaft $A^3$.

$A^5$ is a dumping-platform supported on the short arms of the lever $A^4$ in such manner that it will extend over the end of the floor $A^6$ that is preferably fixed to the frame A in an inclined position, as shown in Fig. 1, but may be connected with the long arms of the levers $A^4$ in such manner that when a wagon is on the platform $A^5$, the weight of the horses can be utilized in combination with the weight of the elevator box for raising the dumping-platform and loaded wagon thereon; or the floor $A^6$ may be short, so that the horses will pass over it and stand on the ground while the wagon is on the platform $A^5$. On the ends of the short arms of the levers $A^4$ are fixed racks, $b$, and to the platform $A^5$ are fixed toothed segments, $b'$, to engage the racks in such a manner that they will serve as rockers for tilting and dumping the contents of the wagon into the elevator box $A^7$ at the end of the platform and the rear end of the wagon.

$A^8$ is a drum of peculiar construction fixed to the shaft $A^3$. It has an integral annular ratchet, $b^2$, in one face that is engaged by a pawl, $b^3$, fulcrumed to the base A in such manner that the pawl can be disengaged from the ratchet by means of the lever $b^4$, as clearly shown in Fig. 1. In the other side face of the drum is an annular cavity into which are fitted blocks, $c$, that are pivoted at their ends to a support $c'$ that extends horizontally at the sides of the drum and is fixed to the frame A.

$c''$ is a lever connected with blocks $c$, by means of rigid links $c'''$ in such manner that a lateral pressure on the free end of the lever will cause the blocks to engage the drum, as required, to produce friction to arrest the motion of the drum, and a movement of the lever in a vertical direction will stop the friction, as required, to free the motion of the drum.

$A^9$ is a rope fixed to the drum in such manner that when it is coiled thereon it can be connected with a wagon on the platform to operate the drum by the movement of the wagon as it is advanced from the platform, as required, to elevate the box $A^7$ into which the contents of the wagon are dumped.

$d$ are sprocket wheels fixed to the ends of the shafts $A^3$.

$d'$ are chains on the sprocket-wheels, and these chains are combined with ropes $d''$, that extend over pulleys at the top of the frame $A^2$, and from thence down to a frame that supports the box $A^7$, to which frame they are attached in such manner that when the shaft and sprocket-wheels are rotated by means of the rope $A^9$, the chains and ropes combined will be operated as required to elevate the box.

$d'''$ are idlers in bearings $d''''$, that are fixed to the frame in such manner that the idlers will aid in keeping the chains in contact with the sprocket-wheels.

$f$ is a rotating shaft in bearings fixed to the frame A. It has a crank-handle on its end, by means of which a person can rotate it in reverse ways at pleasure for the purpose of dumping a wagon on the platform $A^5$. Ropes $f'$, fixed to the shaft and extended over pulleys $f''$, supported on posts $f'''$, fixed to the frame A, are attached to the platform $A^5$ in such a manner that when the ropes are wound upon the shaft $f$ they will lift one end of the platform and lower the other, as required, to dump the contents of the wagon into the elevator-box $A^7$.

$g$ is a ratchet-wheel fixed to the shaft, and $g'$ is a duplex pawl forked at its free end and pivoted to the frame A in such a manner that it will be reversible and adapted to engage the ratchet wheel, as required, to retain the tilting platform and wagon thereon stationary at any angle desired.

$h$ is a rotating shaft in bearings fixed to the frame A.

$h'$ is a drum fixed to the central portion of the shaft.

$h''$ is a chain fixed to the drum $h'$ and to the shaft $A^3$.

$h'''$ are chains fixed to the shaft $h$ and to the levers $A^4$ in such a manner that when a loaded wagon has been advanced upon the platform $A^5$ while the platform is down and the horses are upon the inclined floor $A^6$ and the elevator box $A^7$ is descending the shaft $A^3$ will be rotated by means of the sprocket-wheels $d$ and chains $d'$, and the chains $h''$ will be wound upon the shaft $A^3$ and from the drum $h'$ as required to rotate the shaft $h$ and wind up the chains $h'''$ to pull down the elevated ends of the levers $A^4$, and thereby lift the platform $A^5$ and the loaded wagon thereon from an inclined position to an elevated and level position, as shown in Fig. 1. To thus lower the elevator box and thereby lift the platform and wagon the operator need only disengage the pawl $b'''$ from the ratchet-wheel $b''$ by means of the treadle or lever $b''''$.

J is a hinged section in the top and side of the elevator box that can be turned outward to admit the rear end of the wagon and to facilitate the discharge of the contents of the wagon into the elevator-box from a lower point of elevation than was heretofore required. The upper corners of the box are cut off, and irons $k$ are attached thereto in such a manner that they will engage pins $m$, projecting from the posts or frame $A^2$ to arrest the ascent of one end of the box while the other continues to rise, as required, to empty the contents of the box into a receptacle at the side of the elevator frame. These irons are pivoted and can be reversed, as required, to dump the box in reverse directions at different times.

$k'$ are stops fixed to the box to support the pivoted irons $k$.

$k''$ are irons fixed to the box to restrict its tilting motion by coming in contact with the projections $m$.

$k'''$ are ropes fixed to the hinged end-gates of the box and passed over pulleys attached to the sides of the box and then fastened to the frame upon which the tilting box is carried in such a manner that the hinged gates will be automatically opened and closed by the motion of the tilting box.

$n$ (shown clearly in Fig. 8) are pieces fixed to the platform $A^5$ in such a manner that they will overlap the floor $A^6$ to aid in retaining the platform $A^5$ stationary when in a level position.

Blocks $r$ on the platform $A^5$ represent wheel-scotching-devices.

$s$ are braces fixed to the frame A to support the post $f'''$.

In the practical use of my invention I lower the rear end of the platform $A^5$ and elevate the box $A^7$ and advance a wagon upon the platform and scotch the hind wheels. I then disengage the pawl $b'''$ from the ratchet $b''$ by means of the lever $b''''$ and free the shaft $A^3$, so that the weight of the elevator-box will, by means of its connection with the drum on the shaft, rotate the drum and shaft jointly, and the chains $h''$ will be wound upon the shaft $A^3$, and in so doing will rotate the shaft $h$ to wind up and shorten the chains $h'''$ as required to pull down the long arms of the levers $A^4$ and to lift the platform $A^5$ on their short arms, and when the box is thus lowered and the dumping-platform and wagon jointly elevated I rotate the shaft $f$, and by means of the ropes $f'$, connecting it with the platform $A^5$, I lift the end of the platform so it will tilt toward the elevator-box $A^7$ and empty the contents of the wagon into the elevator box. I next advance the wagon over and off the platform, fasten the rope $A^9$ to the rear axle and advance the wagon, and in so doing rotate the drum and the sprocket-wheels on the shaft $A^3$, as required, to operate the chains and ropes connected therewith and also with the elevator-box, to thereby elevate the box to the point where its contents are to be dumped, and where the box is tilted by the irons $k$ on its end coming in contact with the fixed pin $m$ on the frame, and the hinged end-gates of the box is at the same time opened automatically by the motion of the rope $k'''$ on the pulleys on the sides of the box as required to discharge its contents into a crib or bin.

I claim as my invention—

1. In a wagon dump and elevator, the combination of a base or frame a dumping platform adapted to receive and support a loaded wagon, said platform being supported on a movable support pivoted to the base or frame, an elevator-box suspended from a frame that rises from the base or frame, and suitable connecting devices for transferring and utilizing the weight of the elevator box to lift the dumping-platform and loaded wagon.

2. In a wagon dump and elevator, the combination of levers fulcrumed to a stationary base or frame a dumping-platform adapted to receive and support a loaded wagon, said platform being supported by the short arms of said levers, an elevator box suspended from a frame that rises from the base or frame that supports the platform, and a drum and ropes for transferring and utilizing the weight of the elevator-box to operate the levers and raise the platform and loaded wagon, and mechanism for tilting the dumping platform after it is elevated.

3. In a wagon dump and elevator, the combination of a dumping-platform adapted to receive and support a loaded wagon, said platform being supported on a vertically movable support, a floor or platform adapted to support horses hitched to the wagon, an elevator box suspended from a frame that rises from the base or frame that supports the platform, and a chain and ropes for transferring and utilizing the weight of the elevator-box to lift the dumping-platform and loaded wagon.

4. The levers $A^4$, fulcrumed to the frame A and carrying the platform $A^5$, the floor $A^6$, the elevator-box $A^7$, and mechanism for operating said levers by the weight of the said box, for the purposes stated.

5. The frames A and $A^2$, the shaft $A^3$, having a fixed drum and fixed sprocket-wheels, an elevator box suspended from the frame $A^2$ and connected with the sprocket-wheels by means of ropes and chains, and a rotating shaft $h$, connected with the shaft $A^3$ and the levers $A^4$ by means of chains arranged and combined to operate in the manner set forth, for the purposes stated.

6. The levers $A^4$, having fixed racks $b$, the platform $A^5$, having fixed toothed segments $b'$, the floor $A^6$, the shaft $f$, and the ropes $f'$, arranged and combined with a wagon dump and elevator to operate in the manner set forth, for the purposes stated.

7. The frames A and $A^2$, the shaft $A^3$, having a fixed drum and fixed sprocket-wheels $d$, the levers $A^4$, fulcrumed to the frame and provided with fixed racks $b$, the platform $A^5$, provided with fixed toothed segments $b'$, the elevator box $A^7$, connected with the sprocket-wheels $a$ by means of ropes and chains extended over pulleys at the top of the frame $A^2$, the shaft $f$, connected with the platform $A^5$ by means of ropes $f'$ extended over pulleys $f''$, and the shaft $h$, connected with the shaft $A^3$, and the levers $A^4$ by means of ropes arranged and combined to operate in the manner set forth, for the purposes stated.

8. In a wagon dump and elevator, a vertically movable wagon platform adapted to bodily move the entire wagon vertically; a base for supporting the platform; means for raising and lowering the said platform and the entire wagon thereon; a movable box adapted to receive the contents of a wagon on the platform; and mechanisms adapted to raise and lower said box.

JOHN S. KIDD.

Witnesses:
L. L. COBURN,
A. M. BEST.